Oct. 22, 1957  W. J. DE BEAUBIEN ET AL  2,810,270
AIR CONDITIONING SYSTEMS FOR VEHICLES
Filed Sept. 27, 1954  3 Sheets-Sheet 2
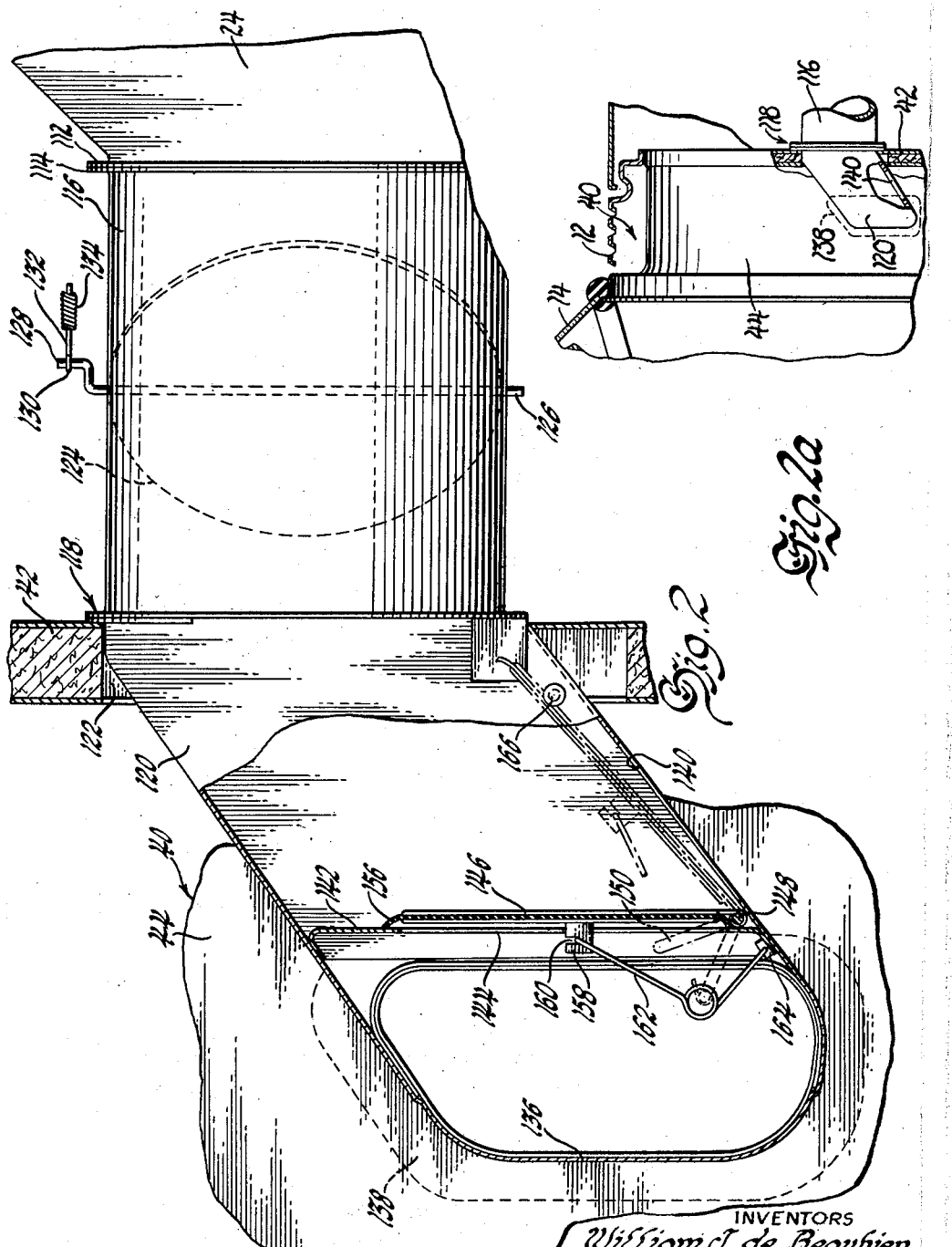
INVENTORS
William J. de Beaubien,
John Ralph Holmes &
BY Herman S. Kaiser
ATTORNEY

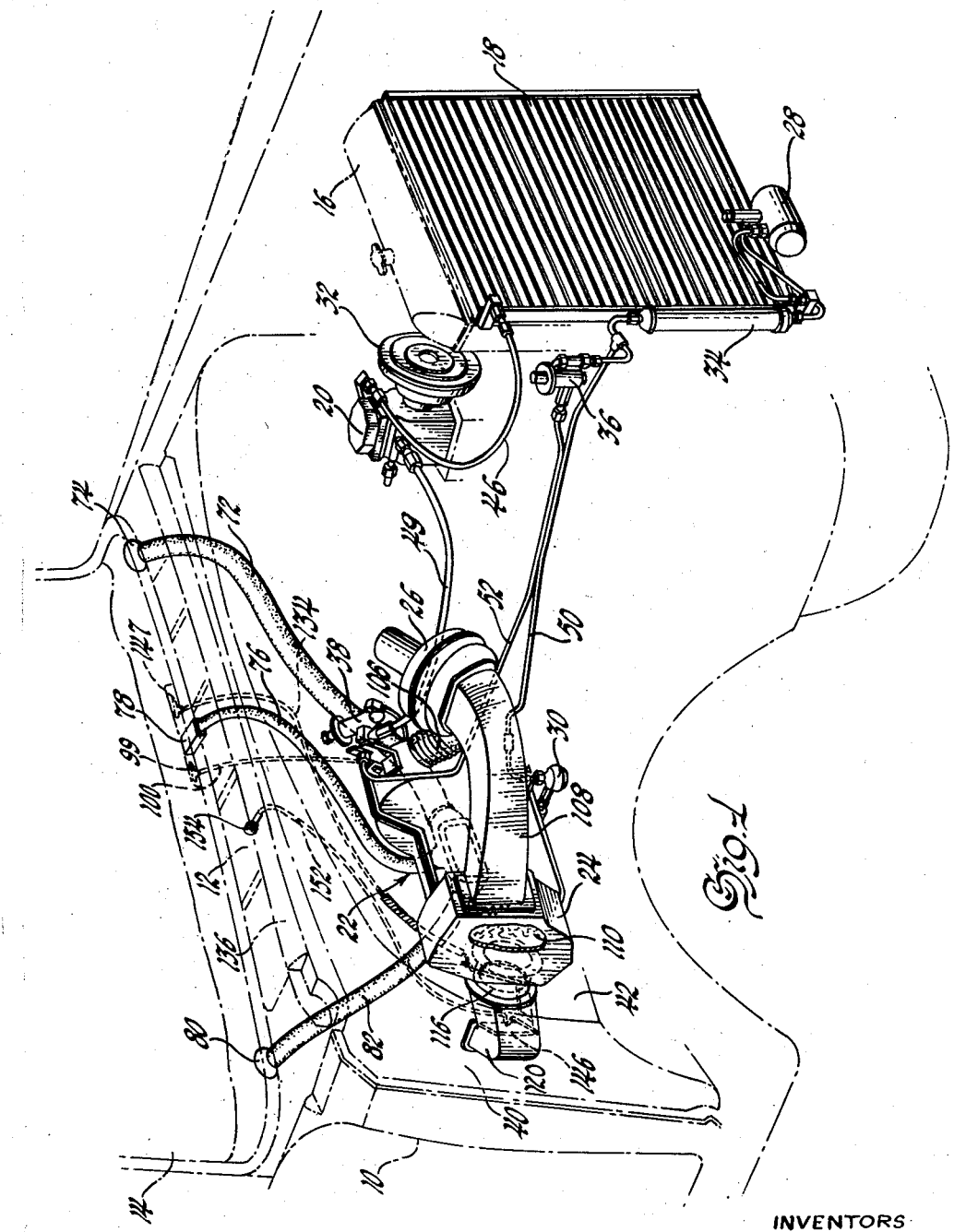

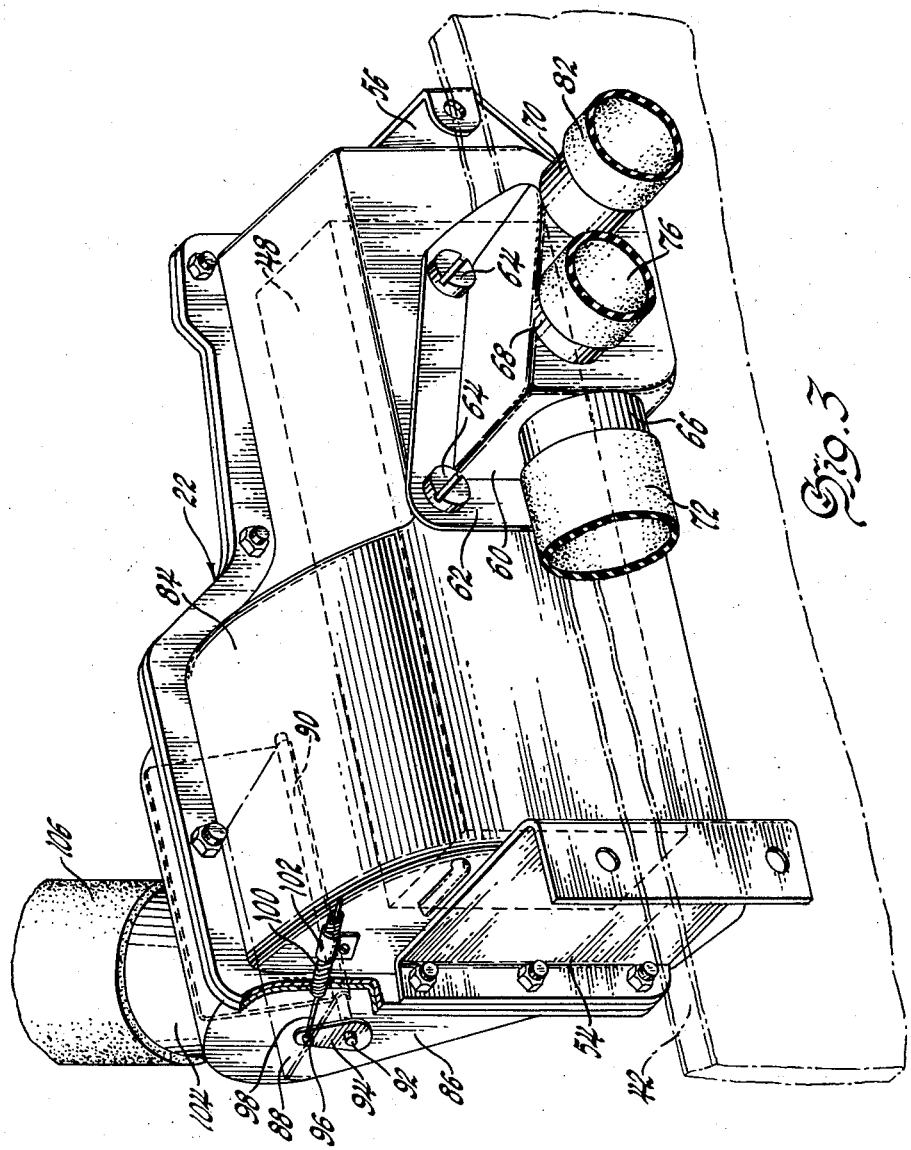

United States Patent Office 2,810,270
Patented Oct. 22, 1957

2,810,270

AIR CONDITIONING SYSTEMS FOR VEHICLES

William J. de Beaubien, Birmingham, and Herman S. Kaiser, Pontiac, Mich., and John Ralph Holmes, Lockport, N. Y., assignors to General Motors Corporation, Detroit, Mich., a corporation of Delaware Application September 27, 1954, Serial No. 458,317

5 Claims. (Cl. 62—117.1)

This invention relates to air conditioning systems and more particularly to such systems as employed on motor vehicles.

In air conditioning the passenger compartments of automobiles, it is often desirable to introduce large volumes of fresh and cooled air and at other times, particularly during very hot weather, it is desirable to vary the nature of the air supply by recirculating previously cooled air to increase the cooling effect of the air conditioning systems. It is also desirable that at all times a minimum amount of moisture be introduced with the fresh air and that the entire system be compact and easily and effectively controlled.

An object of the present invention is to provide an improved air conditioning system of compact arrangement whereby comparatively dry fresh air and/or recirculated air may be cooled and introduced into the passenger compartment of a vehicle.

A feature of the invention is a duct system with a portion thereof communicating at one end with the passenger compartment of a vehicle and that portion being located within a shroud chamber from which fresh air may be introduced to the system.

These and other important features of the invention will now be described in detail in the specification and then pointed out more particularly in the appended claims.

In the drawings:

Fig. 1 is a perspective phantom view of portions of an automobile with which one embodiment of an air conditioning system illustrating the present invention is associated;

Fig. 2 is an enlarged and partly sectional view of details in the duct system shown in Fig. 1;

Fig. 2a is a sectional view through the cowl of an automobile and disclosing parts illustrated in Fig. 2; and Fig. 3 is an enlarged and perspective view of an evaporator and air distributor partially shown in Fig. 1.

An automobile body having shroud chambers for the admission of ventilating air and to which the air conditioning equipment embodying the present invention may be applied is disclosed in the copending application for United States Letters Patent Serial No. 455,056, filed September 9, 1954, in the names of James D. Leslie, Robert M. Fox and Ellis J. Premo, and entitled "Vehicle Ventilation System Using Shroud Chambers."

In Fig. 1, a portion of an automobile body 10 is disclosed. This body is provided with an air inlet 12 extending across the cowl and almost the length of the windshield 14. The engine is not shown but a conventional radiator 16 is depicted.

The conditioning system includes main elements such as a condenser 18 mounted in front of the radiator, a compressor 20, an evaporator 22, a filter casing 24, a blower 26, a refrigerant receiver 28 and an expansion valve 30. The compressor is belt driven from the engine by means of a pulley and clutch arrangement 32. Auxiliary elements of the system comprise a refrigerant filter and dehydrator assembly 34, an evaporator by-pass valve 36, a regulator valve 38, suitable conduits and connections. A somewhat similar arrangement of elements is shown in the copending application for United States Letters Patent Serial No. 399,014, filed December 18, 1953, in the names of Holmes, Zwicker and Mandy and entitled "Air Conditioning Systems."

Applicants, by means of the present invention, have successfully and advantageously associated the above elements of an air conditioning system with a vehicle body having shroud chambers. The result is a structural combination of the body and system which greatly contributes to passenger comfort because of the amount and dryness of the air which may conveniently be admitted for either cooling or ventilating. Heating may be effected by employing a shroud chamber not utilized in the cooling system. A heating system of this type is disclosed in the copending application for United States Letters Patent Serial No. 457,450, filed September 21, 1954, in the name of William J. de Beaubien and entitled "Automotive Heating, Ventilating and Defrosting System."

In the drawings, air is forced through the cowl inlet 12 by ram effect as the vehicle is under way. This air is guided horizontally and then downwardly in a path following the contour of the body into a shroud chamber 40 in the righthand side of the vehicle. This chamber is defined by a bottom wall which could be an extended portion of the toe board, outer and inner substantially vertical walls, a fire wall 42, and body structure including the front door pillar. The chamber is formed in what might be called the cowl portion of the body. The inner wall 44 (Fig. 2) of the chamber may have more than one opening for ventilation air but only one opening is necessary in employing the present invention. The shroud chamber in the other or lefthand side of the vehicle may be employed for ventilation, heating and defrosting using equipment such as described in Serial No. 455,056 heretofore referred to but not forming a part of the present invention and is, therefore, not described herein.

In the present instance the main elements of the air conditioning system operate as in application Serial No. 399,014 heretofore referred to in that refrigerant is forced by the compressor 20 through a conduit 46 to the top of the condenser 18 and from thence into a receiver 28 and through the assembly 34 and expansion valve 30 into an evaporator core 48. From the core the fluid passes through the regulator valve 38 by way of conduit 49 back to the compressor. The assembly 34 and the expansion valve 30 are connected by means of a main conduit 50 and the evaporator core may be by-passed by a conduit 52 which connects the by-pass valve 36 to the regulator valve 38.

It will be seen in Fig. 3 that two brackets 54 and 56 are arranged to extend forwardly from the fire wall 42 to support the evaporator casing within the engine compartment. Communicating with the rear of the casing 22 is a distributor housing 60 which extends through an opening in the fire wall and has a flange 62 which is attached to the casing 22 by means of screws 64. The housing is provided with three outlets 66, 68 and 70.

The outlet 66 is connected by means of a flexible conduit 72 to a suitable nozzle 74 mounted on the left end of the instrument panel. The outlet 68 is connected by means of a flexible conduit 76 to a nozzle 78 mounted midway the length of the instrument panel. The outlet 70 communicates with a nozzle 80 at the right end of the instrument panel by means of a conduit 82.

The evaporator casing 22 is so formed that air in passing through the casing must pass either through the core 48 or over it in order to enter the housing 60. The casing is enlarged as at 84 to provide a passage over the core. A forwardly extending portion 86 of the evaporator encloses a valve 88 which is adapted to rotate with a shaft 90. The ends of the latter are journaled in the opposed walls of the casing portion 86. One end 92 of the shaft 90 extends outside of the casing and has affixed thereto an arm 94 provided with a pivoted connection 96 to a Bowden wire 98. One end of a conduit 100 is fixed with relation to the casing 22 by means of a clamp 102. The wire 98 is slidable within the conduit. The valve 88 is so proportioned that when it is moved to an upright position, it closes off the air passage which would otherwise convey air over the core 48 and forces the air to pass through the core. When the valve is swung downwardly into its lowest position, it cooperates with the inner walls of the casing portion 86 to direct any air entering the casing 22 to pass over or by-pass the core 48. The forward and curved wall of the casing portion 86 is provided with an inlet 104 which communicates by means of a conduit 106 to the outlet of the blower 26.

The inlet to the blower communicates with the outlet of the filter casing 24 by means of a conduit 108. Vertically mounted within the casing 24 is a filter element 110 arranged in such a way that all air passing through the casing 24 must pass through the filter.

The rear of the filter casing 24 is flanged as at 112 (Fig. 2) for joinder with a flange 114 of a valved conduit 116 which in turn is joined by suitable flanges 118 to the fire wall 42 and an inclined conduit or duct 120 which passes through an opening 122 made in the fire wall. A valve 124 is mounted within the conduit 116 to rotate with a shaft 126 which is pivoted in opposite sides of the conduit. One end 128 of the rod 126 is formed into a crank and is pivotally connected to a Bowden wire 132. The latter is protected by a suitable flexible conduit 134.

The duct 120 extends rearwardly and downwardly into a horizontal duct portion 136. The latter portion communicates through the wall 44 with the passenger compartment and is mounted with relation thereto by means of a flange 138.

The inclined duct 120 is provided with a downwardly directed opening 140 in its wall and a vertical interior partition 142. The latter is provided with an opening 144 which is adapted to be controlled by a valve 146. This valve is mounted on a shaft 148 which is pivoted in the walls of the duct and formed at one end into a crank 150. The end of the crank 150 is pivoted in a conventional manner to a Bowden wire supported for sliding movement in a flexible conduit 152 and having a knob 154 affixed to the Bowden wire for operation at the instrument panel. The valve 146 is provided with a rubber lip 156 to aid in tightly seating the valve against the partition 142 when it is desired that the opening 144 be closed. A central portion of the valve is provided with a rearwardly extending bracket 158 having a slot 160. One end of an anti-rattle spring 162 is engaged in the slot and the other end is retained in a bracket 164 fastened to the inside bottom wall of the duct 120. The latter bracket may conveniently be made a part of the sheet metal forming the vertical partition 142. One vertical wall of the duct 120 is provided with a rivet 166, the head of which extends inside the duct to constitute a stop whereby the valve 146 cannot close the opening 140 to any greater extent than that indicated by the valve 146 in its dot-and-dash line position of Fig. 2.

In operation of the system and assuming that the evaporator core 48 is under refrigeration by operation of the compressor, condenser and expansion valve, air is admitted through the cowl inlet 12 and into the shroud chamber 40. Valve 124 (Fig. 2) is opened by operation of the Bowden wire 132 and fresh air may be admitted through the opening 140 from the shroud chamber to the duct 20 or recirculated by way of the horizontal portion 136 and the opening 144. This air, whether recirculated from the relatively low zone of the passenger compartment or taken as fresh air or a mixture of the two, is drawn upwardly and then through the conduit 116, the filter element 110 and into the blower 26. The air is then forced into the evaporator casing 22 by means of the conduit 106 and is passed through or over the evaporator core 48 dependent upon the setting of the valve 88. If the valve 88 is in its lowered position, the air will pass over or bypass the core 48 and be guided into the housing 60 from which it is admitted into the passenger compartment by means of the nozzles 74, 78 and 80 without being cooled. If the valve 88 is in its raised position, then the air is compelled to go through the core 48 and be ejected by those same nozzles to cool the passenger compartment. The valve 88 is conveniently operated by the Bowden wire 98 to which a knob 99 is affixed conveniently within reach of the operator in the central area of the instrument panel. The valve 124 is also controlled by a similar knob 147 located on the instrument panel and attached to the wire 132.

From the above description, it may be seen that all air may be cut off from the air conditioning system by operation of the valve 124 through actuation of the knob 147. With this valve open and port 144 closed fresh outside air only may be admitted and cooled or, if valve 146 is lowered, a large proportion of the air cooled may be air that is recirculated from the passenger compartment.

The stop 166 insures that a small amount of outside air will be mixed with the recirculated air when recirculation has been selected. This prevents infiltration of hot outside air in other places of the vehicle body and will minimize any possibility of window fogging which might occur under some atmospheric conditions.

A two-speed switch (not disclosed in the drawings) is employed for controlling the blower 26 and the latter may be used for forced air flow which may be desired particularly if the automobile is stationary.

The outlets or nozzles 74, 78 and 80 within the car may take various forms and preferably they are made adjustable by mounting them in ball sockets so that the air may be directed at various angles such as along the inside roof line, downwardly, directly at the passengers or sidewise.

In place of the two knobs 99 and 147 for operating the valves 88 and 124, a single lever may be employed whereby operation may be simplified. At one end of its travel range, both valves are held closed. A continued movement of the lever may be caused to open these valves in such a way that air flow through the evaporator core is gradually increased until the valve 88 is fully closed. A suitably switch may be associated with the lever whereby the blower motor and the compressor are controlled at the proper and desired times. Air introduced to the passenger compartment may be made progressively cooler with a continued movement of the lever. Such a lever arrangement is disclosed in the application Ser. No. 399,014, filed Dec. 18, 1953, in the names of John Ralph Holmes, Lawrence A. Zwicker, and Robert R. Mandy and entitled "Air Conditioning Systems."

We claim:

1. An air conditioning system for a vehicle body having a passenger compartment and a cowl assembly with an air inlet communicating with a shroud chamber, an evaporator assembly with a casing having outlet means arranged to discharge cooled air into said compartment, a blower with its outlet connected to said casing, a duct passing from said compartment by way of a recirculation port and through said shroud chamber to the inlet of said blower, a port in said duct communicating with said chamber for receiving fresh air, and a valve arranged in said duct and adapted to control said ports.

2. An air conditioning system for a vehicle body having a passenger compartment and a cowl assembly with an air inlet communicating with a shroud chamber, an evaporator assembly including a cooling coil in a casing having communication with said compartment, a blower with its outlet connected to said casing, a valve mounted in said casing to cause by-passing of said cooling core, a duct passing from said compartment through said shroud chamber to the inlet of said blower, a port in said duct and communicating with said chamber, a valve arranged to control said port, a valve arranged to control said duct, and the arrangement being such that all air flow to the blower may be closed off or air from said compartment may be recirculated.

3. An air conditioning system for a vehicle body having a passenger compartment and a cowl assembly with an air inlet communicating with a shroud chamber, an evaporator with duct means for discharging cooled air into said compartment, a blower with its outlet communicating with said evaporator, a duct passing from said compartment and through said shroud chamber to the inlet of said blower, a port leading through the underside of said duct and communicating with said chamber for receiving fresh air, and valve means in said duct for shutting off air flow to said blower or admitting fresh or recirculated air thereto.

4. An air conditioning system for a vehicle body having a passenger compartment and a cowl assembly with a fresh air inlet communicating with a shroud chamber, an evaporator including a casing and a cooling coil in said casing, duct means connected with said casing for discharging cooled air into said compartment, a blower arranged forwardly of said casing and having its outlet connected to the latter, a duct passing from said compartment and through said shroud chamber to the inlet of said blower, said duct including air filter means, a port leading downwardly into said shroud chamber from that portion of said duct located within said chamber, and a valve arranged to control said port.

5. An air conditioning system for a vehicle body having a passenger compartment, an instrument panel, and a cowl assembly with a fresh air inlet communicating with a shroud chamber, an evaporator including a casing and an air cooling coil therein, duct means connected with said casing and having nozzles directed into said compartment through spaced points on said instrument panel, a blower connected to said casing, a duct with one end communicating with a relatively low zone of said compartment and the other end communicating at a higher elevation with said blower, a portion of said duct passing through said shroud chamber and having a port communicating with the latter, a first valve controlling said port, a second valve arranged between said first valve and blower to control said duct, a filter arranged in said duct, and means on said instrument panel for operating said valves.

References Cited in the file of this patent
UNITED STATES PATENTS

| | | |
|---|---|---|
| 2,026,929 | Backe | Jan. 7, 1936 |
| 2,045,826 | Benolken | June 30, 1936 |
| 2,185,486 | Wahlberg | Jan. 2, 1940 |
| 2,213,016 | Perkins | Aug. 27, 1940 |